(12) United States Patent
Menzel et al.

(10) Patent No.: US 10,459,445 B2
(45) Date of Patent: Oct. 29, 2019

(54) UNMANNED AERIAL VEHICLE AND METHOD FOR OPERATING AN UNMANNED AERIAL VEHICLE

(71) Applicant: Intel IP Corporation, Santa Clara, CA (US)

(72) Inventors: Stefan Menzel, Stockdorf (DE); Daniel Pohl, Puchheim (DE); Thomas Seiler, Puchheim (DE); Markus Achtelik, Woerthsee (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/718,021

(22) Filed: Sep. 28, 2017

(65) Prior Publication Data

US 2019/0094861 A1 Mar. 28, 2019

(51) Int. Cl.
| | |
|---|---|
| G05D 1/00 | (2006.01) |
| G08G 5/00 | (2006.01) |
| G06F 15/16 | (2006.01) |
| G05D 1/10 | (2006.01) |
| B64C 39/02 | (2006.01) |
| G08G 5/04 | (2006.01) |

(52) U.S. Cl.
CPC ......... *G05D 1/0094* (2013.01); *B64C 39/024* (2013.01); *G05D 1/101* (2013.01); *G08G 5/0021* (2013.01); *G08G 5/0069* (2013.01); *G08G 5/0091* (2013.01); *G08G 5/04* (2013.01); *G08G 5/045* (2013.01); *B64C 2201/027* (2013.01); *B64C 2201/108* (2013.01); *B64C 2201/141* (2013.01); *B64C 2201/146* (2013.01)

(58) Field of Classification Search
CPC .......... G05D 1/0094; G05D 1/10; G05D 1/00; G08G 5/00; B64D 47/08; H04W 4/90; G06F 15/16; B60F 5/02; H05B 37/02
See application file for complete search history.

(56) References Cited

U.S. PATENT DOCUMENTS

| | | | | |
|---|---|---|---|---|
| 5,317,689 | A * | 5/1994 | Nack ....................... | G06T 15/06 345/505 |
| 2013/0154476 | A1* | 6/2013 | Hessling ............ | H05B 33/0893 315/77 |
| 2017/0072755 | A1* | 3/2017 | Zhou ................... | B64C 29/0075 |
| 2017/0154536 | A1* | 6/2017 | Kreiner ............... | G08G 5/0043 |
| 2017/0275023 | A1* | 9/2017 | Harris .................. | H04N 13/239 |
| 2018/0004231 | A1* | 1/2018 | Michini ................ | G01C 21/20 |
| 2018/0279105 | A1* | 9/2018 | Huber .................... | H04W 4/90 |

* cited by examiner

*Primary Examiner* — Yuri Kan
(74) *Attorney, Agent, or Firm* — Viering, Jentschura & Partner MBB

(57) ABSTRACT

According to various aspects, an unmanned aerial vehicle may be described, the unmanned aerial vehicle including: one or more sensors configured to gather thermal information associated with a vicinity of the unmanned aerial vehicle; one or more processors configured to determine at least one control information based on the thermal information and to control the unmanned aerial vehicle based on the at least one control information.

13 Claims, 9 Drawing Sheets

UNMANNED AERIAL VEHICLE AND METHOD FOR OPERATING AN UNMANNED AERIAL VEHICLE

TECHNICAL FIELD

Various aspects relate generally to an unmanned aerial vehicle and a method for operating an unmanned aerial vehicle.

BACKGROUND

An unmanned aerial vehicle (UAV) may have a one or more processors to control flight of the unmanned aerial vehicle along a predefined flight path, also referred to as flight controller. The flight path may be provided for example by manual remote control, waypoint control, target tracking, etc. Further, an obstacle detection and avoidance system may be implemented to avoid collision of the unmanned aerial vehicle with an obstacle located in the flight path of the unmanned aerial vehicle. As an example, an unmanned aerial vehicle with obstacle detection may be configured to stop in front of a solid object, as for example, a wall, a tree, a pillar, etc., and thus avoiding a collision.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
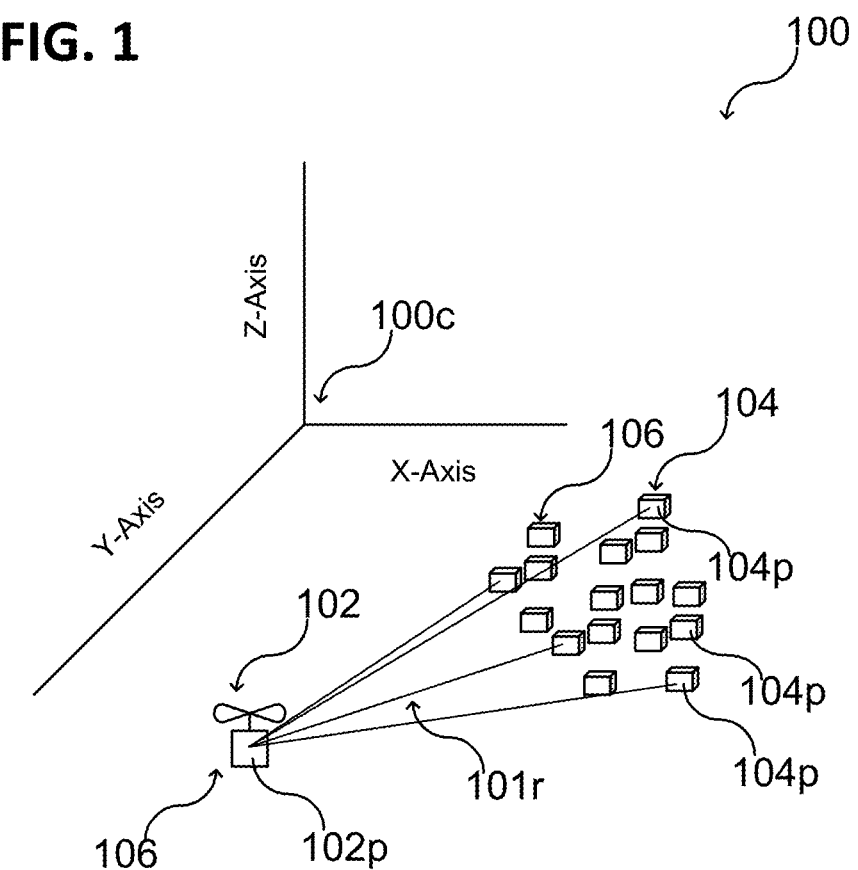
FIG. 1 shows an exemplary map that may be used to control an unmanned aerial vehicle, according to various aspects.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and/or electrical changes may be made without departing from the scope of the disclosure. The various aspects of the disclosure are not necessarily mutually exclusive, as some aspects can be combined with one or more other aspects to form new aspects.

Various aspects are described in connection with methods and various aspects are described in connection with devices. However, it may be understood that aspects described in connection with methods may similarly apply to the devices, and vice versa.

The term "exemplary" may be used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of [objects]," "multiple [objects]") referring to a quantity of objects expressly refers more than one of the said objects. The terms "group (of)," "set [of]," "collection (of)," "series (of)," "sequence (of)," "grouping (of)," etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The terms "processor" or "controller" as, for example, used herein may be understood as any kind of entity that allows handling data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" detailed herein may be understood to include any suitable type of memory or memory device, e.g., a hard disk drive (HDD), a solid-state drive (SSD), a flash memory, etc.

Differences between software and hardware implemented data handling may blur. A processor, controller, and/or circuit detailed herein may be implemented in software, hardware and/or as hybrid implementation including software and hardware.

The term "system" (e.g., a sensor system, a control system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

The term "position" used with regards to a "position of an unmanned aerial vehicle", "position of an object", "position of an obstacle", and the like, may be used herein to mean a point or region in a two- or three-dimensional space. It is understood that suitable coordinate systems with respective reference points are used to describe positions, vectors, movements, and the like.

The term "map" used with regards to a two- or three-dimensional map may include any suitable way of describing positions of objects in the two- or three-dimensional space.

According to various aspects, a voxel map may be used to describe objects in the three dimensional space based on voxels associated with objects. To prevent collision based on a voxel map, ray-tracing, ray-casting, rasterization, etc., may be applied to the voxel data.

An unmanned aerial vehicle (UAV) is an aircraft that has the capability of autonomous flight. In autonomous flight, a human pilot is not aboard and in control of the unmanned aerial vehicle. The unmanned aerial vehicle may also be denoted as unstaffed, uninhabited or unpiloted aerial vehicle, -aircraft or -aircraft system or drone.

The unmanned aerial vehicle, according to various aspects, may include a support frame that serves as basis for mounting components of the unmanned aerial vehicle, as for example, motors, sensors, mechanic, transmitter, receiver, and any type of control to control the functions of the unmanned aerial vehicle as desired.

The unmanned aerial vehicle, according to various aspects, may include a camera gimbal having an independent two- or three-axes degree of freedom to properly track a target, e.g. a person or point of interest, with a tracking camera independently of an actual flight direction or actual attitude of the unmanned aerial vehicle. In some aspects, a depth camera may be used for tracking, monitoring the vicinity, providing images to a user of the drone, etc. A depth camera may allow associating depth information with an image, e.g., to provide a depth image. This allows, for example, providing an image of the vicinity of the unmanned aerial vehicle including depth information about one or more objects depicted in the image. As an example, a depth image may include information to indicate a relative distance of objects displayed in the image. This distance information may be, but is not limited to, colors and/or shading to depict a relative distance from a sensor. Based on depth images, a three dimensional map may be constructed from the depth information. Said map construction may be achieved using a depth map engine, which may include one or more processors or a non-transitory computer readable medium configured to create a voxel map (or any other suitable map) from the depth information provided by the depth images. According to various aspects, a depth image may be obtained by a stereo camera, e.g., calculated from two or more images having a different perspective.

The unmanned aerial vehicle, according to various aspects, includes at least one sensor for obstacle detection, e.g. only one sensor, two sensors, or more than two sensors. The at least one sensor can be fixedly mounted on the support frame of the unmanned aerial vehicle. Alternatively, the at least one sensor may be fixed to a movable mounting structure so that the at least one sensor may be aligned into a desired direction. The number of sensors for obstacle detection may be reduced to only one sensor that is directed into a heading direction of the unmanned aerial vehicle.

According to various aspects, an unmanned aerial vehicle may have a heading direction. The heading direction may be understood as a reference direction assigned with a straight forward flight direction.

The unmanned aerial vehicle described herein can be in the shape of an airplane (e.g. a fixed wing airplane) or a copter (e.g. multi rotor copter), i.e. a rotorcraft unmanned aerial vehicle, e.g. a quad-rotor unmanned aerial vehicle, a hex-rotor unmanned aerial vehicle, an octo-rotor unmanned aerial vehicle. The unmanned aerial vehicle described herein may include a plurality of rotors (e.g., three, four, five, six, seven, eight, or more than eight rotors), also referred to as propellers. Each of the propeller has one or more propeller blades. The propellers may be fixed pitch propellers.

The unmanned aerial vehicle may be configured to operate with various degrees of autonomy: under remote control by a human operator, or fully or intermittently autonomously, by onboard computers. The unmanned aerial vehicle may be configured to take-off and land autonomously in a take-off and/or a landing mode. Alternatively, the unmanned aerial vehicle may be controlled manually by a radio control (RC) at take-off and/or landing. The unmanned aerial vehicle may be configured to fly autonomously based on a flight path. The flight path may be a predefined flight path, for example, from a starting point or a current position of the unmanned aerial vehicle to a target position, or, the flight path may be variable, e.g., following a target that defines a target position. In some aspects, the unmanned aerial vehicle may switch into a GPS-guided autonomous mode at a safe altitude or save distance. The unmanned aerial vehicle may have a one or more fails safe operations modes, e.g., returning to the starting point, landing immediately, etc. In some aspects, the unmanned aerial vehicle may be controlled manually, e.g., by a remote control during flight, e.g. temporarily.

For industrial tasks, an unmanned aerial vehicle may become more and more automated to be easy and efficient to use. One-click solutions for complicated tasks may be desired. Collision detection and obstacle avoidance may be a desired functions implemented in the unmanned aerial vehicle. However, collision data for a conventional collision detection and obstacle avoidance may in general only be gathered from solid objects, e.g. using depth cameras, radar, sonar, etc., with all detected obstacles treated in a similar way.

As an example, there may be various objects in the vicinity of the unmanned aerial vehicle, and it may be desired that the unmanned aerial vehicle may keep various predefined distances from these objects, e.g., 1 m, 2 m, and 10 m from objects with temperatures up to 100° C., 200° C., and 1000° C. respectively. For example, in the application scenario of a bridge inspection, an unmanned aerial vehicle may be used to get very close to all pillars and constructions pieces of the bridge. In contrast, in the application scenario of an inspection of a chimney or an inspection inside a steel plant, it may be desired that an unmanned aerial vehicle avoids any objects that radiate a high amount of heat, since the heat may damage the unmanned aerial vehicle (e.g., permanently) or reduce the functionality of the unmanned aerial vehicle during exposure to the heat.

According to various aspects, one or more heat sensors may be used to provide thermal information associated with objects in the vicinity of the unmanned aerial vehicle. The thermal information may be used, for example, to detect heat obstacles that are to be avoided by the unmanned aerial vehicle. The one or more heat sensors may include a thermal imaging camera, a thermocouple, and/or any other suitable sensor to sense thermal radiation and/or temperatures.

According to various aspects, a heat obstacle may be an obstacle defined by a temperature associated with a solid object, a liquid, a gas, etc. A heat obstacle may damage the unmanned aerial vehicle or at least reduce the functionality of the unmanned aerial vehicle. A predefined threshold may be used to classify an object as heat obstacle. The predefined threshold may be associated with a temperature, a thermal radiation, etc.

According to some aspects, one or more heat sensors of the unmanned aerial vehicle may be configured to deliver temperature values of objects for an improved collision detection and obstacle avoidance in automated unmanned aerial vehicle tasks.

In the following, an unmanned aerial vehicle is described in more detail. The unmanned aerial vehicle may include one or more thermal imaging cameras to obtain temperature data. Based on the temperature data, a collision detection and obstacle avoidance may be carried out. However, other possibilities (e.g., other thermal sensors than the thermal imaging camera) may be used to provide the temperature data.

According to various aspects, the unmanned aerial vehicle may store information about its vicinity in order to determine potentially colliding objects. The stored information may be or may provide a map. The map may be based on geometric data, point clouds, voxels or other representations. In the following, various configurations of the unmanned aerial vehicle and various functionalities may be described for voxels, a voxel map, and ray tracing. However, alternatively or additionally, other suitable representations may be used as well.

In the following, various configurations and/or functionalities of an unmanned aerial vehicle are described, according to various aspects. In one or more Aspects, the unmanned aerial vehicle may include one or more sensors configured to sense thermal information associated with a vicinity of the unmanned aerial vehicle; one or more processors configured to determine at least one control information based on the thermal information. The one or more processors may be further configured to control the unmanned aerial vehicle based on the at least one control information.

Sensing thermal information may include various different aspects, e.g., measuring a temperature, measuring thermal radiation, or any other measurement to gather thermal information. According to various aspects, the thermal information may be mapped to position information, e.g., to control flight of the unmanned aerial vehicle. Various aspects may be related to the determination of the position information and the correlation of the thermal information and the position information with one another. As an example, a map may be used to store the thermal information and the position information in a suitable way to control one or more operations of the unmanned aerial vehicle based on the map. However, other suitable implementations may be used to allow control of the unmanned aerial vehicle based on at least the thermal information.

FIG. 1 illustrates a schematic view of a map 100 that is used to control flight of an unmanned aerial vehicle 102, according to various aspects. The unmanned aerial vehicle 102 may be represented in the map 100. As an example, an actual position of the unmanned aerial vehicle 102 may be tracked via the map 102 dynamically. Further, one or more objects 104 may be represented in the map 100. As an example, a position of the one or more objects 104 may be determined by the unmanned aerial vehicle 102 and stored in the map 102. The map 100 may be updated dynamically with respect to the one or more objects 104 upon receiving new information associated with the position of the one or more objects 104.

According to various aspects, the map 100 may be a three-dimensional map representing the vicinity (or at least a part of the vicinity) of the unmanned aerial vehicle 102. However, a two-dimensional map (e.g., a horizontal plane) may be used, according to some aspects. The map 100 may include a coordinate system 100c. The coordinate system 100c may be, for example, a Cartesian coordinate system including three orthogonal axes (e.g., referred to as X-axis, Y-axis, and Z-axis). However, any other suitable coordinate system 100c may be used.

According to various aspects, the map 100 may be used to represent positions 104p of one or more objects 104 relative to a position 102p of the unmanned aerial vehicle 102. According to various aspects, a computer engine (e.g., a 3D-computer engine) may be used to generate the map 100 and to represent the unmanned aerial vehicle 102 and the one or more objects 104 in the map 100. Therefore, dynamics may be included in the map 100, e.g., movement of the one or more objects 104, appearance and disappearance of the one or more objects 104, a change of one or more characteristics (a temperature change) of the one or more objects 104, etc.

According to various aspects, the information on how to build that map 100 may be received from one or more sensors configured to detect any type of objects 104 in a vicinity of the unmanned aerial vehicle 102. As an example, one or more cameras, e.g., one or more RGB cameras, one or more depth cameras, etc., may be used to obtain image data from the vicinity of the unmanned aerial vehicle 102. Based on the obtain image data, the map 100 may be built accordingly. According to various aspects, the map 100 may be built during flight of the unmanned aerial vehicle 102 (e.g., on the fly starting with an empty map 100) using one or more sensors of the unmanned aerial vehicle 102. The information gathered by the one or more sensors may be stored in one or more memories included in the unmanned aerial vehicle 102. Alternatively or additionally, the map 100 may include one or more predefined objects 104, etc. The predefined objects 104 may be known from a previous flight of the unmanned aerial vehicle 102 or from other information that may be used to build the map 100. According to various aspects, the map 100 of the unmanned aerial vehicle 102 may be correlated with a global map, e.g., via global positioning system (GPS) information, if desired.

According to various aspects, the map 100 may be a voxel map. In this case, the one or more objects 104 and their positions may be represented by one or more voxels in the voxel map. A voxel may include graphic information that defines a three-dimensional volume. Unlike a pixel, which defines a two dimensional space based, for example, on an x-axis and a y-axis, a voxel may have the addition of a z-axis. According to various aspects, the voxels in the voxel map may be configured to carry additional information, such as thermal information, as described in more detail below. According to various aspects, the one or more voxels may be determined from a three-dimensional camera (depth camera) or a combination of image sensors or cameras providing image overlap (e.g., using a 3D-camera). The obtained image data may be processed by a voxel engine to transform the image data into voxels. The voxel engine may be implemented by a computing entity, e.g., including one or more processors, one or more a non-transitory computer readable media, etc. The translation of image data into voxels may be carried out using rasterization, volume ray casting, splattering, or any other volume rendering method. Once translated, the voxels may be stored in the voxel map. Once stored in the voxel map, the flight of the unmanned aerial vehicle 102 may be controlled based on the voxels stored on the voxel map.

According to various aspects, the map 100 may be a dynamic map, e.g., the map 100 may be updated (also referred to as built and/or rebuilt) in a pre-defined time interval, for example, new objects may be added, object may be deleted, position changes of the objects may be monitored, etc. According to various aspects, the map 100 may be updated based on sensor data (e.g., obtained by one or more sensors of the unmanned aerial vehicle 102). Alternatively, the map 100 may be updated based on data transmitted to the unmanned aerial vehicle 102, e.g., via a wireless communication. In the map 100, the position 102$p$ of the unmanned aerial vehicle 102 relative to the position 104$p$ of the one or more objects 104 may change during flight of the unmanned aerial vehicle 102. A reference for a movement of the unmanned aerial vehicle 102 and/or of the one or more objects 104 may be a fixed ground, e.g., defined by GPS information or other suitable information.

According to various aspects, the unmanned aerial vehicle 102 may be configured to check (e.g., during flight) for a collision with one or more objects 104 near the unmanned aerial vehicle 102 based on the map 100. In the case that a voxel map is used, the unmanned aerial vehicle 102 may check for a collision with the one or more objects 104 by ray tracing within the voxel map. However, other implementations of a collision detection may be used.

As illustrated in FIG. 1, in the map 100, the unmanned aerial vehicle 102 may trace rays 101$r$ against the map (e.g., in any direction, in flight direction, within a sector along the flight direction, etc.) to determine how far objects 104 are away from the unmanned aerial vehicle 102. Further, the direction of the one or more objects 104 relative to the unmanned aerial vehicle 102 may be determined. According to various aspects, a collision avoidance operation may be carried out based on the relative position of the one or more objects 104 with respect to the actual position of the unmanned aerial vehicle 102. Illustratively upon pre-estimating a collision with one or more objects, these one or more objects may be regarded as obstacles, since a collision with a solid object in general may have a high likelihood of harming the unmanned aerial vehicle 102. As an example, the collision avoidance operations may include stopping at a pre-defined safety distance from the detected obstacle, circumflying the detected obstacle with a pre-defined safety distance, increasing distance from the detected obstacle, and/or returning to a pre-defined safety position (e.g., a starting position or return to home position).

According to various aspects, the collision avoidance operation may be modified based on the thermal information. As an example, the pre-defined safety distance may be adapted based on a temperature or thermal classification (e.g., including classes representing hot and/or cold) associated with the obstacle. Further, an obstacle may be defined only based on the thermal information, e.g., for a non-solid object or if no object may be correlated with the thermal information, also referred to as heat obstacle.

According to various aspects, the map 100 may be a 3D computer graphics environment and ray tracing may be used for collision detection and avoidance and/or heat obstacle detection and avoidance.

According to various aspects, the one or more objects 104 represented in the map 100 may be or may include obstacles. In some aspects, the map 100 may be built from obstacles detected by the unmanned aerial vehicle 102; the obstacles may be represented by collision data. Illustratively, solid objects in the vicinity of the unmanned aerial vehicle 102 may be classified as obstacles since a collision would damage the unmanned aerial vehicle 102. Additionally, according to various aspects, any object or region in the vicinity of the unmanned aerial vehicle 102 having a high temperature (e.g., greater than a pre-defined temperature, e.g., greater than about 100° C., greater than about 200° C., greater than about 500° C.) may be represented as an obstacle, also referred to as heat obstacle. A heat obstacle may include solid objects, liquid objects, and/or gaseous objects (e.g., smoke, steam, etc.) having a high temperature (e.g., greater than a pre-defined temperature, e.g., greater than about 100° C., greater than about 200° C., greater than about 500° C.).

According to various aspects, the map 100 may include information 106 about the temperature at a certain point in the vicinity of the unmanned aerial vehicle 102. In the case of a voxel map, the temperature may be associated with a certain voxel or group of voxels. According to some aspects, the temperature may be an extra attribute of a voxel, which could be either detailed and keep the precise value of the temperature or be scaled within a shorter range, indicating cold or hot.

According to various aspects, the map 100 may include thermal information 106 associated with at least one object 104 (e.g., and with its position 104$p$) that is represented in the map 100. In this case, an unmanned aerial vehicle 102 may include one or more memories to store position data associated with the position 104$p$ of one or more objects 104 in a two- or three-dimensional space and temperature data associated with the temperature 106 of the one or more objects 104; and one or more processors configured to control flight of the unmanned aerial vehicle 102 based on the position data and temperature data.

According to various aspects, the map 100 may include thermal information 106 associated with a position in the two- or three-dimensional space, e.g., without being associated to a solid object. In this case, an unmanned aerial vehicle 102 may include one or more memories to store position data associated with a position in a two- or three-dimensional space and temperature data associated with a temperature at the position; and one or more processors configured to control flight of the unmanned aerial vehicle 102 based on the position data and temperature data.

In the following, an exemplary use case is provided for control flight of the unmanned aerial vehicle 102 and/or a heat obstacle detection and heat obstacle avoidance implemented in the unmanned aerial vehicle 102.

Figure 2A:
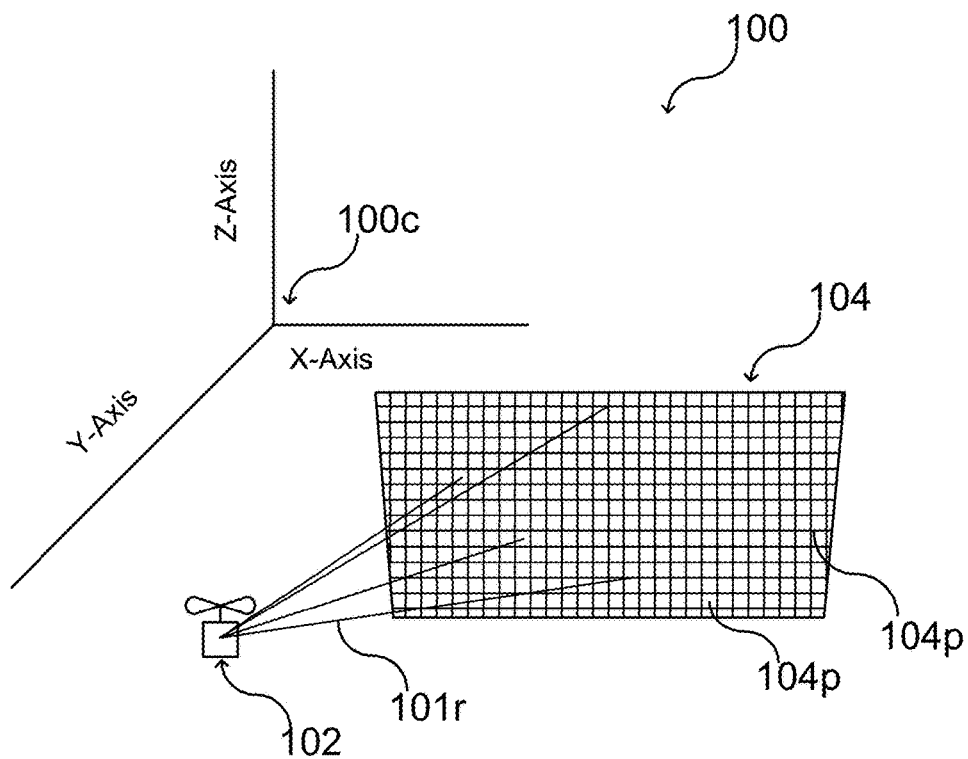
FIGS. 2A to 2D show an exemplary use case for a map to control an unmanned aerial vehicle, according to some aspects.

FIG. 2A schematically shows an object detection setup based on the map 100, according to various aspects. In this case, the map 100 may be used to represent position information 104p of an object 104 (e.g., a flat wall). The unmanned aerial vehicle 102 may be positioned, for example, in front of the object 104, as illustrates in FIG. 2A. In some aspects, the position information 104p may be related to one or more solid obstacles that are detected in the vicinity of the unmanned aerial vehicle 102. In the case that no thermal information 106 is associated with the one or more solid obstacles, the unmanned aerial vehicle 102 may, for example, circumfly the one or more solid obstacles or stop in front of the one or more solid obstacles, e.g., both with a pre-defined safety distance (e.g., with a pre-defined safety distance in the range from about 0.1 m to about 5 m or any other suitable pre-defined safety distance).

Figure 2B:
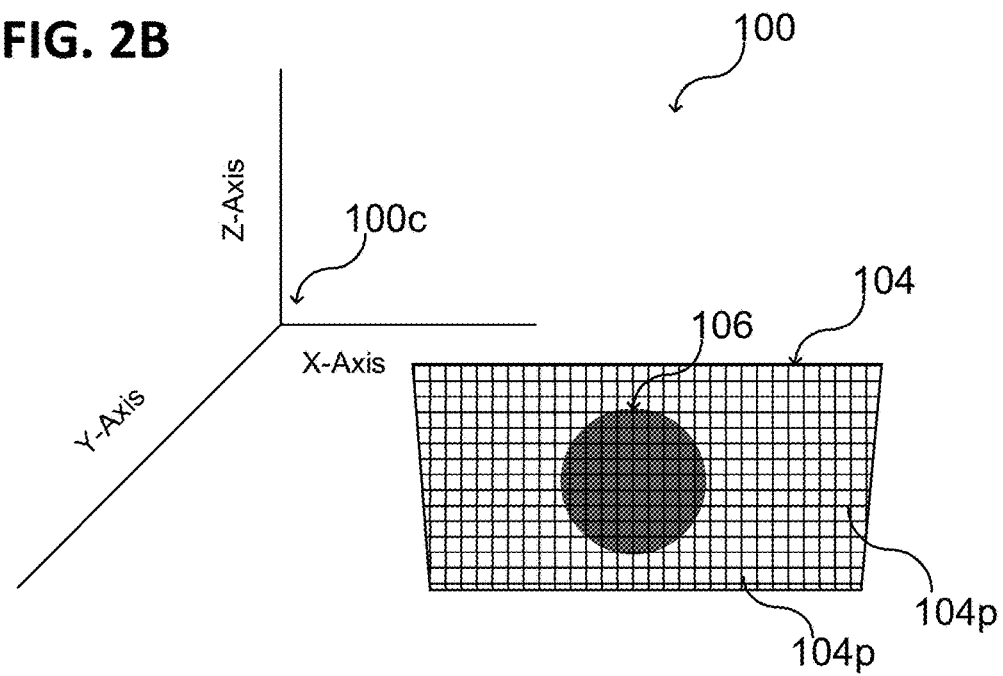

FIG. 2B shows thermal information 106 associated with the object 104 (e.g., with a flat wall). The object 104 and the thermal information 106 associated with the object 104 may be represented in the map 100 (e.g., in a voxel map), as schematically illustrated in FIG. 2C.

Illustratively, the map 100 may be generated using position information 104p and thermal information 106. The position information 104p and the thermal information 106 may be associated with one or more solid obstacles that are detected in the vicinity of the unmanned aerial vehicle 102. Alternatively or additionally, the position information 104p and the thermal information 106 may be associated with one or more positions in the vicinity of the unmanned aerial vehicle 102, e.g., not associated with a solid obstacle.

Figure 2C:
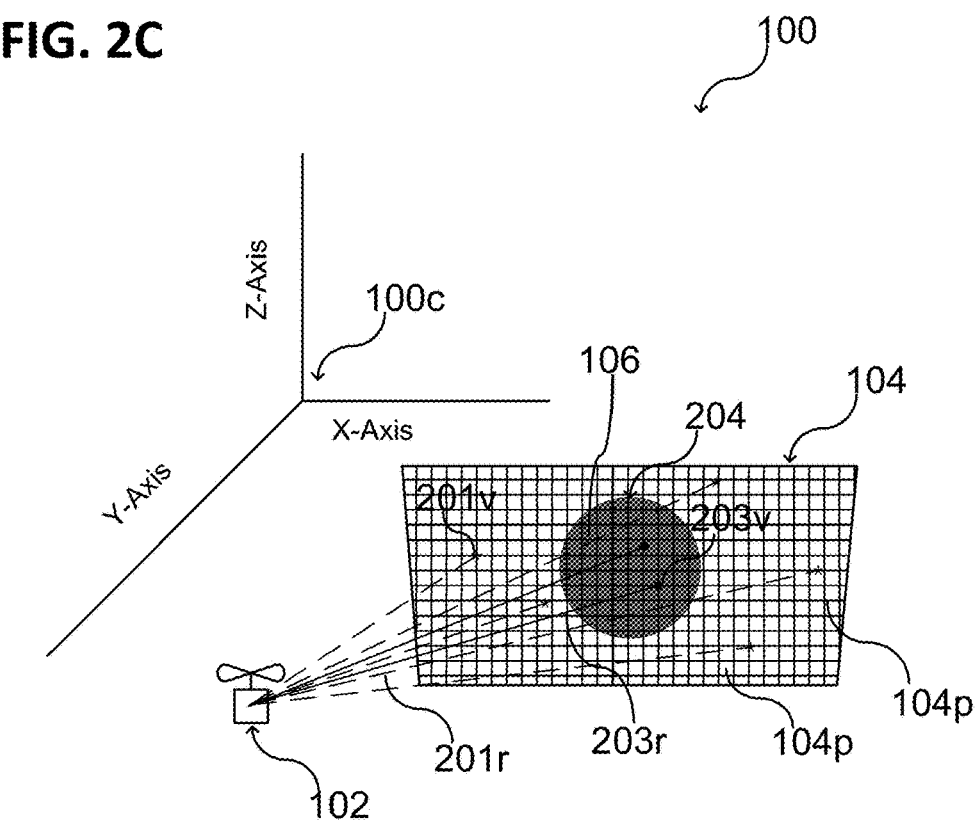

As an example, FIG. 2C illustrates the object 104 as a flat wall having a hot area 204 in the center of the flat wall. In an application scenario, the hot area 204 may represent, for example, an oven, a fireplace, or any other hot object or hot part of a hot object.

In some aspects, the position information 104p may be related to one or more solid obstacles that are detected in the vicinity of the unmanned aerial vehicle 102. In the case that thermal information 106 are associated with the one or more solid obstacles, the unmanned aerial vehicle 102 may, for example, circumfly the one or more solid obstacles or stop in front of the one or more solid obstacles, e.g., both with a temperature dependent pre-defined safety distance. Illustratively, the safety distance that the unmanned aerial vehicle 102 keeps from the one or more solid obstacles may be adapted based on the thermal information 106 provided for the one or more solid obstacles (e.g., without loss of generality with a pre-defined safety distance in the range from about 0.1 m at a temperature of about or below 50° C. to about 5 m at a temperature of about 500° C. or higher). A safety distance from a solid object may be defined as the shortest between a fragile part (e.g., the rotor) of the unmanned aerial vehicle 102 and the solid object.

Figure 2D:
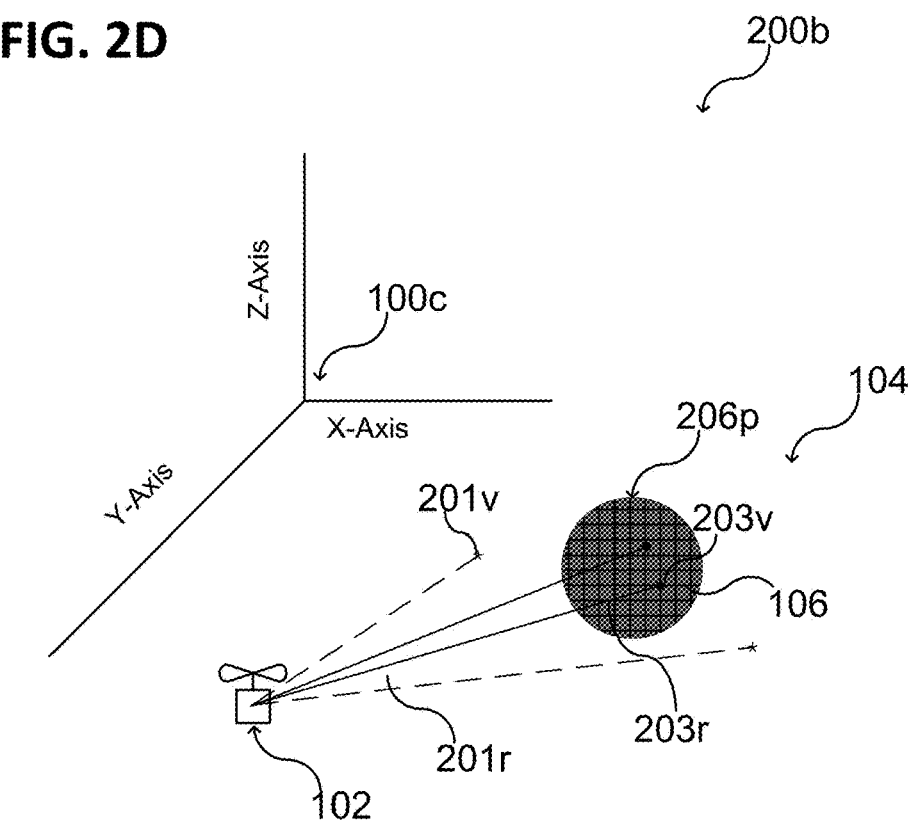

Further, as illustrated in FIG. 2D in a schematic view, the thermal information 106 may be represented in the map 100 (e.g., in a voxel map), according to various aspects. In this case, the thermal information 106 may be associated with one or more positions 206p in the vicinity of the unmanned aerial vehicle 102. In this case, there may be no visible object associated with the thermal information 106. However, one or more voxels may be used to represent the one or more positions 206p in the map 100. Further, the thermal information 106 may be associated with one or more positions 206p of gaseous objects (e.g., smoke, steam, etc.) or other visible objects in the vicinity of the unmanned aerial vehicle 102. According to various aspects, the unmanned aerial vehicle 102 may, for example, circumfly the one or more positions or stop in front of the one or more positions. In this case, the unmanned aerial vehicle 102 may keep a temperature dependent pre-defined safety distance from the one or more positions 206p. Illustratively, the safety distance that the unmanned aerial vehicle 102 keeps from the one or more positions 206p may be adapted based on the thermal information 106 provided for the one or more positions 206p (e.g., without loss of generality with a pre-defined safety distance in the range from about 1 m at a temperature of about or below 50° C. to about 5 m at a temperature of about 500° C. or higher). A safety distance from a position 206p associated with a thermal information 106 may be defined as the shortest distance between a part of the unmanned aerial vehicle 102 susceptible to heat damage (e.g., a polymer body, a sensor, a power supply, a processor, a memory, etc.) and the position.

According to various aspects, a thermal detection (also referred to as heat detection) may be implemented in the unmanned aerial vehicle 102 based on the map 100 that includes the position information 104p, 206p and the thermal information 106. According to various aspects, the thermal detection may be used in combination with a collision detection and/or only to avoid positions associated with heat that may damage the unmanned aerial vehicle 102.

Illustratively, the object 104 (e.g., a wall) may be represented in the map 100 with a hint (e.g., a tag, a color, a temperature value, etc.) associated with a temperature of the object 104. In the case of a voxel map, voxels having heat attributes associated therewith that allow the unmanned aerial vehicle 102 to implement of heat avoidance (e.g., based on the heat of the objects and/or at positions in the vicinity of the unmanned aerial vehicle 102) may be stored.

According to various aspects, ray tracing may be used for heat avoidance based on the map 100, as illustrated in FIG. 2C and FIG. 2D. In this case, a distance from the unmanned aerial vehicle 102 to another object 104 or position 206p may be determined, and it can be ascertained whether a ray 201r is traced to (e.g., hits) an area/voxel 201v associated with a harmless temperature (referred to herein as "cold") or whether a ray 203r is traced to (e.g., hits) an area/voxel 203v associated with a harmful temperature (referred to herein as "hot"). If a voxel 203v indicates, for example, a hot area, the unmanned aerial vehicle 102 may be configured to keep farther away from this voxel 203v (and therefore from the hot heat area) than from a cold area. The unmanned aerial vehicle 102 may be configured to assess whether a temperature is harmless or harmful by comparing the thermal information (e.g., temperature value) to at least one threshold. The threshold may depend on the specific type of the unmanned aerial vehicle 102, e.g., its ability to withstand heat impact. However, an obstacle detection and avoidance may be carried out for both hot and cold solid objects 104.

In the following, a method may be described to generate the map 100 including thermal information, also referred to as heat map including heat information. According to various aspects, a map 100 may be generated using one or more sensors of the unmanned aerial vehicle 102. The data for generating the map 100 may be collected during flight and stored in one or more memories of the unmanned aerial vehicle 102. Further, a map 100 may be stored in one or memories of the unmanned aerial vehicle 102. The data for the map 100 may be provided externally to the unmanned aerial vehicle 102 via a data transmission (e.g., wireless during flight and/or before flight, e.g., wired before flight).

According to various aspects, at least one thermal imaging camera may be used to gather (e.g., sense, detect, receive) thermal information (also referred to as thermal data or heat data). The at least one thermal imaging camera may be synced with at least one depth camera, so that for each pixel from the thermal imaging camera, a valid depth value may be known as well. A depth value may be represented in the map 100 as a position.

Figure 3:
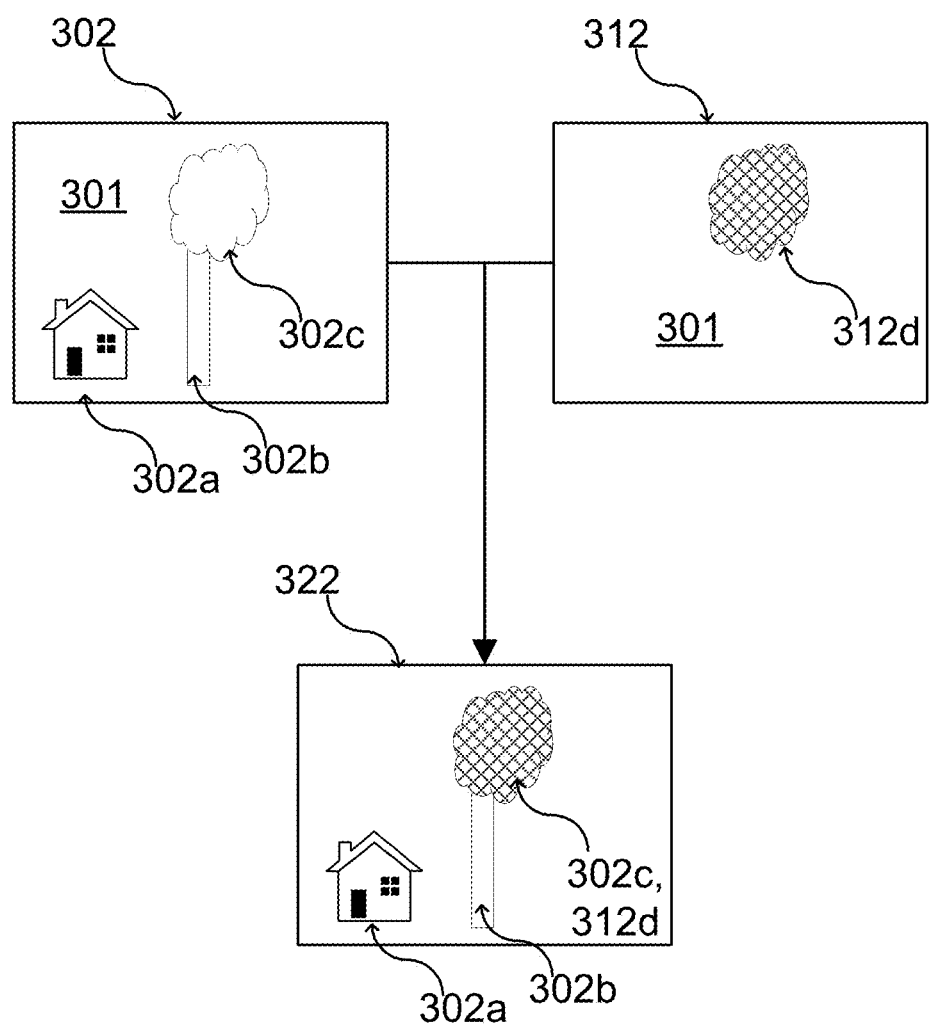
FIG. 3 shows an exemplary image or map including superimposing images with position information and thermal information, according to some aspects.

FIG. 3 illustrates a schematic view of a thermal image 312 and a depth image 302 that are superimposed 322 onto one another. The thermal information of the thermal image 312 may be associated with the position (depth) information of the depth image 302. The thermal image 312 may be obtained by at least one thermal imaging camera (e.g., mounted at the unmanned aerial vehicle 102) and the depth image 302 may be obtained by at least one depth camera (e.g., mounted at the unmanned aerial vehicle 102). However, any other suitable sensor arrangement may be used to generate the thermal information and the position information and to associate these with one another. For transforming position information of a depth camera or a stereo camera into a position on the map 100, the position of the depth camera or the stereo camera may be considered.

As illustrated in FIG. 3, the depth image 302 may include one or more objects 302a, 302b, 302c detected in the vicinity 301 of the unmanned aerial vehicle 102. This may include solid objects, as for example buildings (e.g., a house 302a, a chimney 302b, etc.). Further, the depth image 302 may include visible gaseous objects, as for example a smoke and/or steam cloud 302c.

As an example, a solid object 302a, 302b may be avoided by a collision detection and avoidance operation. Further, a gaseous object 302c may be avoided by a detection and avoidance operation as well, e.g., independently from its temperature. Alternatively, a gaseous object 302c may be detected and avoided depending on its temperature, e.g., if a temperature of the gaseous object 302c would be harmful to the unmanned aerial vehicle 102, an avoidance operation may be carried out.

As illustrated in FIG. 3, the thermal image 312 may include thermal information 312d sensed in the vicinity 301 of the unmanned aerial vehicle 102. The thermal information 312d may be associated with the one or more objects 302a, 302b, 302c by superimposing the images 302, 312.

As an example, the thermal information 312d may be associated with a visible gaseous object 302c, as for example a smoke and/or steam cloud 302c. Illustratively, the gaseous object 302c illustrated in FIG. 3 may be identified as a heat obstacle based on the thermal information 312d. In this case, the solid objects 302a, 302b may be obstacles for the unmanned aerial vehicle 102 and the gaseous object 302c may be a heat obstacle for the unmanned aerial vehicle 102 if the temperature associated with the gaseous object 302c would be harmful to the unmanned aerial vehicle 102. Illustratively, the unmanned aerial vehicle 102 may fly through the gaseous object 302c or not dependent from the temperature associated with the gaseous object 302c.

According to various aspects, the superimposed image 322 may be used to build the map 100. Illustratively, the detected obstacles and heat obstacles may be stored in a suitable form to consider the detected obstacles and heat obstacles in the flight control of the unmanned aerial vehicle 102.

According to various aspects, the thermal camera and the depth camera may be synced to one another. In this case, both cameras may be precisely calibrated with their intrinsic and extrinsic camera parameters. Once that is done, images from one camera may be transformed into the space of the other camera and depth information and thermal information may be associated with one another to construct the map 100 including the thermal information.

According to various aspects, based on the map 100 that is generated and used to control flight of the unmanned aerial vehicle 102, a prediction for a movement of one or more objects detected in the vicinity of the unmanned aerial vehicle 102 may be carried out.

Figure 4A:
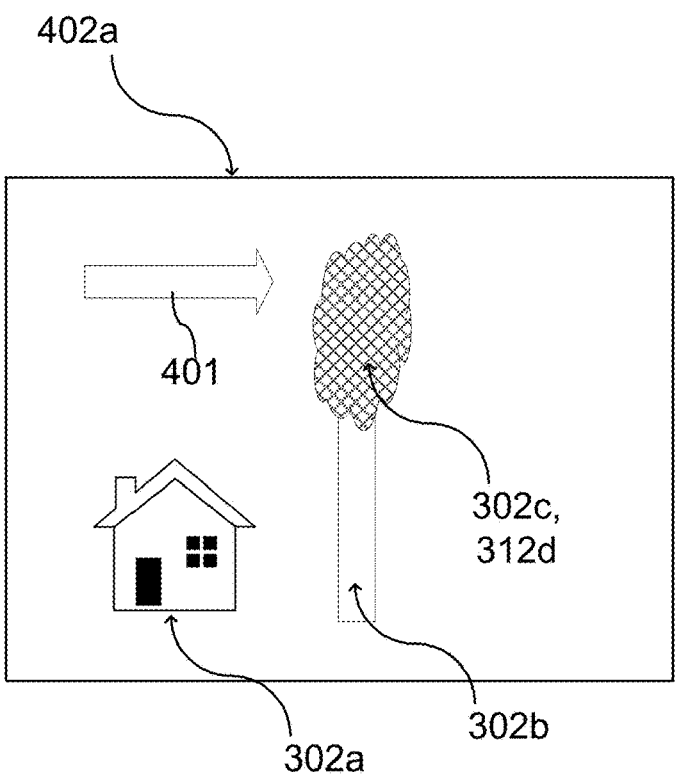
FIGS. 4A and 4B show an exemplary image or map including a prediction of movement of one or more objects in the vicinity of an unmanned aerial vehicle, according to some aspects.
Figure 4B:
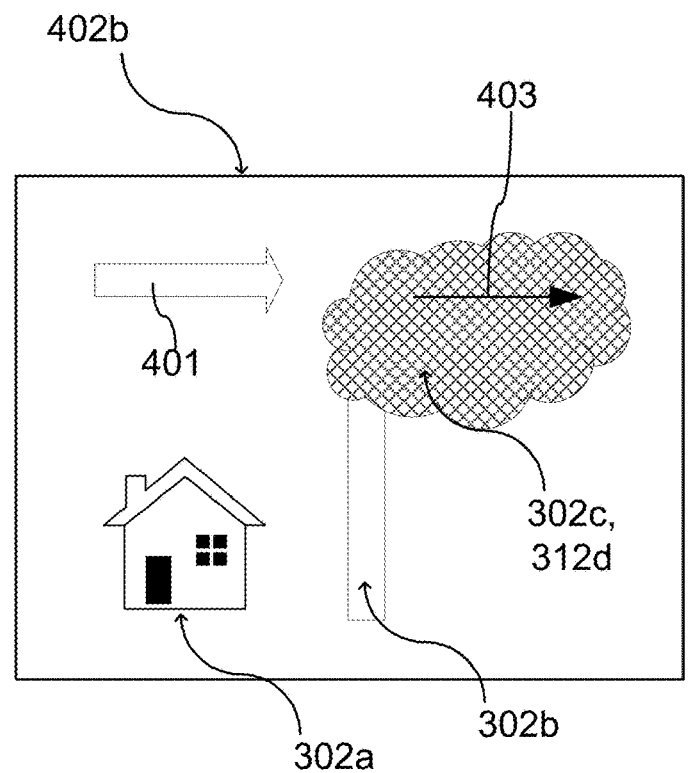

As an example, the map 100 may include and/or consider meteorology information 401, such as the prevailing wind direction and the wind speed, as illustrated in FIG. 4A and FIG. 4B in a schematic view. Based on the meteorology information 401, a prediction for a movement of a (e.g., gaseous) object 302c (e.g., of a smoke cloud) detected in the vicinity of the unmanned aerial vehicle 102 may be carried out. Therefore, the position of the object 302c at an initial stage 402a may be used to predict a movement 403 of the object 302c and therefore a position of the object 302c at a later stage 402b. Illustratively, one or more heat obstacles may be added to the map based on a prediction. This allows controlling of the unmanned aerial vehicle 102 such that positions that are predicted to become a heat obstacle can be avoided.

According to various aspects, it may be the case that heat radiation may be emitted from a heat source into the surrounding of the heat source. Therefore, a precaution may be implemented that refers to marking one or more voxels within a certain volume as potentially dangerous, once a heat source (e.g., a hot object) has been detected. For example, because a hot gas may ascend in the air, a precaution may be specifically implemented in a vertical dimension (e.g., along the vertical direction).

Figure 5:
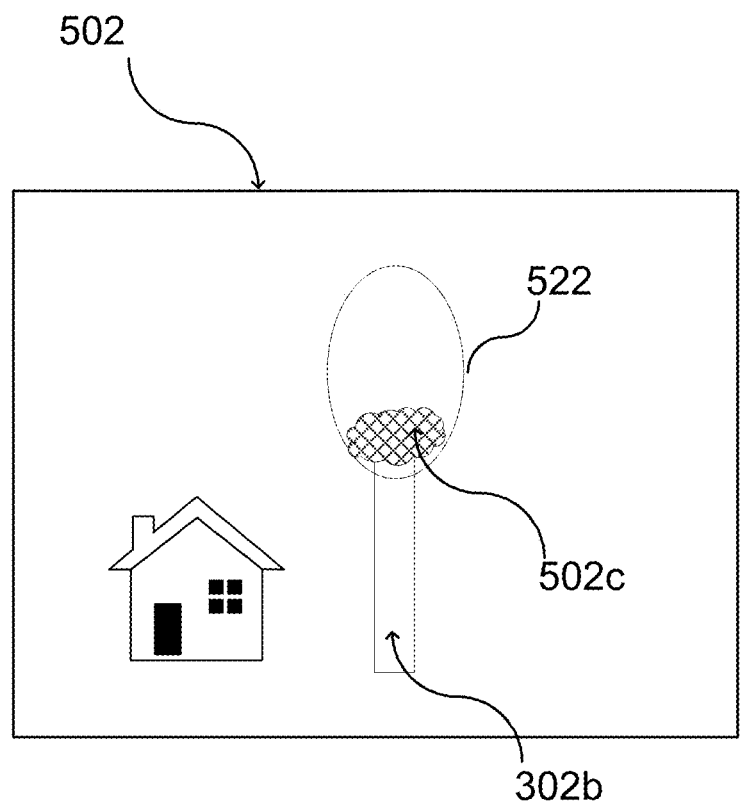
FIG. 5 shows an exemplary image or map including assistant objects defining heat obstacles in a vicinity of an unmanned aerial vehicle, according to some aspects.

As illustrated in FIG. 5 in a schematic view, an ellipsoid 522 or any other assistant object may be associated with a detected heat obstacle 502c (e.g., with a smoke cloud or another gaseous object 302c) in an image 502 that is used to build the map 100 or in the map 100. The ellipsoid 522 may have a greater volume than the detected heat obstacle 502c. The ellipsoid 522 may extend toward the vertical axis (e.g., the z-Axis of the map 100) to consider an ascending heat radiation of the detected heat obstacle 502c. The ellipsoid 522 may define an extended heat obstacle, and, an obstacle avoidance may be carried out based on the extended heat obstacle. In some aspects, the ellipsoids 522 or any other assistant objects may be added to each pixel of the thermal image and/or to each detected voxel having a temperature greater than a predefined threshold.

Figure 6:
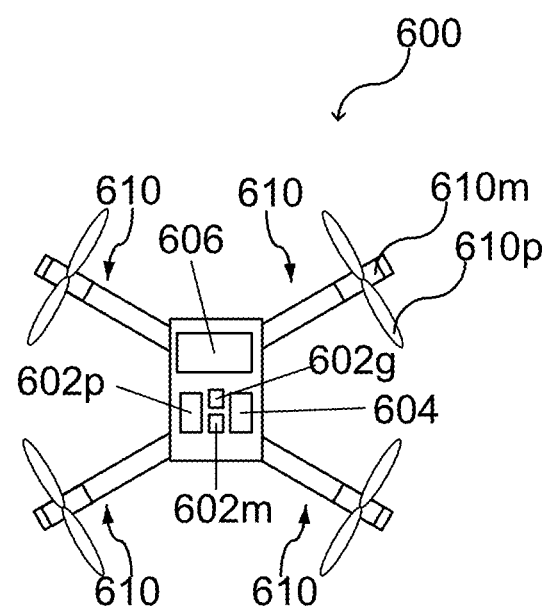
FIG. 6 shows an exemplary unmanned aerial vehicle, according to some aspects.

FIG. 6 illustrates an unmanned aerial vehicle 600 in a schematic view, according to various aspects. In one or more aspects, the unmanned aerial vehicle 600 may be configured as described above with reference to the unmanned aerial vehicle 102. The unmanned aerial vehicle 600 may include a plurality of (e.g., three or more than three, e.g., four, six, eight, etc.) vehicle drive arrangements 610. Each of the vehicle drive arrangements 610 may include at least one drive motor 610m and at least one propeller 610p coupled to the at least one drive motor 610m. The one or more drive motors 610m of the unmanned aerial vehicle 600 may be electric drive motors.

Further, the unmanned aerial vehicle 600 may include one or more processors 602p configured to control flight or any other operation of the unmanned aerial vehicle 600. One or more of the processors 602p may be part of a flight controller or may implement a flight controller. The one or more processors 602p may be configured, for example, to provide a flight path based at least on an actual position of the unmanned aerial vehicle 600 and a desired target position for the unmanned aerial vehicle 600. In some aspects, the one or more processors 602p may control the unmanned aerial vehicle 600 based on the map 100, as described herein. In some aspects, the one or more processors 602p may directly control the drive motors 610m of the unmanned aerial vehicle 600, so that in this case no additional motor controller may be used. Alternatively, the one or more processors 602p may control the drive motors 610m of the unmanned aerial vehicle 600 via one or more additional motor controllers. The one or more processors 602p may include or may implement any type of controller suitable for controlling the desired functions of the unmanned aerial vehicle 600. The one or more processors 602p may be implemented by any kind of one or more logic circuits.

According to various aspects, the unmanned aerial vehicle 600 may include one or more memories 602m. The one or more memories may be implemented by any kind of one or more electronic storing entities, e.g. a one or more volatile memories and/or one or more non-volatile memories. The one or more memories 602m may be used, e.g., in interaction with the one or more processors 602p, to build and/or store the map 100, according to various aspects.

Further, the unmanned aerial vehicle 600 may include one or more power supplies 604. The one or more power supplies 604 may include any suitable type of power supply, e.g., a directed current (DC) power supply. A DC power supply may include one or more batteries (e.g., one or more rechargeable batteries), etc.

According to various aspects, the unmanned aerial vehicle 600 may include one or more sensors 606. The one or more sensors 606 may be configured to monitor a vicinity of the unmanned aerial vehicle 600. The one or more sensors 606 may be configured to detect obstacles in the vicinity of the unmanned aerial vehicle 600. Therefore, the one or more processors may be further configured to modify the flight path of the unmanned aerial vehicle 600 based on detected obstacles to generate a collision free flight path to the desired target position avoiding obstacles in the vicinity of the unmanned aerial vehicle.

The one or more sensors 606 may include, for example, one or more cameras (e.g., a depth camera, a stereo camera, a thermal imaging camera, etc.), one or more ultrasonic sensors, etc. The one or more sensors 606 may include, for example, a thermocouple or any other suitable temperature sensor. The unmanned aerial vehicle 600 may further include a position detection system 602g. The position detection system 602g may be based, for example, on global positioning system (GPS) or any other available positioning system. Therefore, the one or more processors 602p may be further configured to modify the flight path of the unmanned aerial vehicle 600 based on data obtained from the position detection system 602g.

According to various aspects, the one or more processors 602p may include at least one transceiver configured to provide an uplink transmission and/or downlink reception of radio signals including data, e.g. video or image data and/or commands. The at least one transceiver may include a radio frequency (RF) transmitter and/or a radio frequency (RF) receiver.

The one or more processors 602p may further include an inertial measurement unit (IMU) and/or a compass unit. The inertial measurement unit may allow, for example, a calibration of the unmanned aerial vehicle 600 regarding a predefined plane in a coordinate system, e.g., to determine the roll and pitch angle of the unmanned aerial vehicle 600 with respect to the gravity vector (e.g. from planet earth). Thus, an orientation of the unmanned aerial vehicle 600 in a coordinate system may be determined. The orientation of the unmanned aerial vehicle 600 may be calibrated using the inertial measurement unit before the unmanned aerial vehicle 600 is operated in flight modus. However, any other suitable function for navigation of the unmanned aerial vehicle 600, e.g., for determining a position, a flight velocity, a flight direction, etc., may be implemented in the one or more processors 602p and/or in additional components coupled to the one or more processors 602p.

According to various aspects, the one or more processors 602p of the unmanned aerial vehicle 600 may be configured to implement an obstacle detection and avoidance by considering thermal information. To match the input from thermal images and depth images, as for example illustrated in FIG. 3, image processing may be used. Further, to hold the additional attribute of the temperature in the (e.g., internal) map 100 of the unmanned aerial vehicle 600, as described herein, at least one computing resource may be used. The unmanned aerial vehicle 600 may be configured to avoid heat obstacles, as described herein. This may allow an automated inspection tasks (e.g., a 1-click inspection) by prohibiting that the unmanned aerial vehicle 600 may take damage from heat.

The heat obstacles may be detected by the one or more sensors 606 of the unmanned aerial vehicle 600. As described herein, a map 100 may be generated (e. g., by the one or more processors 602p of the unmanned aerial vehicle 600 using the one or more memories 602m of the unmanned aerial vehicle 600) and heat obstacles may be represented in the map 100. The heat obstacles may be detected (or in other words, the map may be built) based on sensor data provided by the one or more sensors 606 of the unmanned aerial vehicle 600 to the one or more processors 602p and the one or more memories 602m.

Therefore, the one or more sensors 606 may include a thermal imaging camera and a depth camera to build the map 100. According to various aspects, the one or more processors 602p of the unmanned aerial vehicle 600 may implement a 3D computer engine to provide the map 100. For visualization, a graphic engine may be used.

In some aspects, the one or more sensors 606 may include a temperature sensor, e.g., without a special camera system. The temperature sensor may be mounted directly to the body of the unmanned aerial vehicle 600 or on a stick extending in front, to enable faster detection of heat sources. The temperature data provided by the temperature sensor may be stored in the map 100, wherein the corresponding position information may be defined by the position of the unmanned aerial vehicle. As an example, in the case that the unmanned aerial vehicle 600 flies towards a dangerously hot area, it would save these values in the map and try to reverse its course to where it was still safe.

According to various aspects, the heat detection may be used in combination with GPS data and a professional mapping services (e.g. google maps), the drone would be aware if it is over an area where it is expected that no extreme heat should occur. As an example, when flying over a forest area and the temperature increases quickly, there might be a forest fire. In this case, the unmanned aerial vehicle 600 may be configured to reverse its course so as to avoid closer contact with high temperatures and thus potentially avoid destruction. Further, the thermal information (e.g., representing a forest fire) may be relayed to a pilot or supervisor of the unmanned aerial vehicle 600, who could react to a forest fire and call emergency services.

Figure 7:
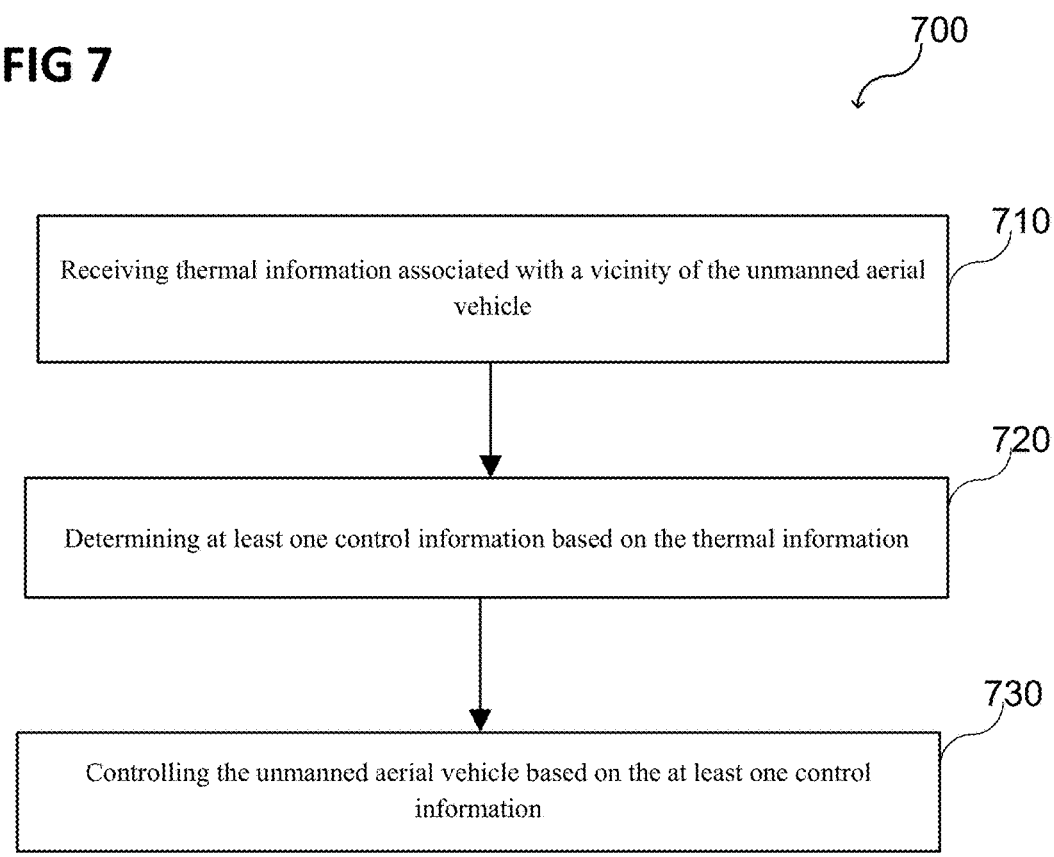
FIG. 7 shows an exemplary method for operating an unmanned aerial vehicle, according to some aspects.

FIG. 7 illustrates a schematic flow diagram of a method 700 for operating an unmanned aerial vehicle (e.g., the unmanned aerial vehicle 102, 600 as described herein), according to some aspects. The method 700 may include: in 710, receiving thermal information associated with a vicinity of the unmanned aerial vehicle; in 720, determining at least one control information based on the thermal information; and, in 730, controlling the unmanned aerial vehicle based on the at least one control information.

Figure 8:
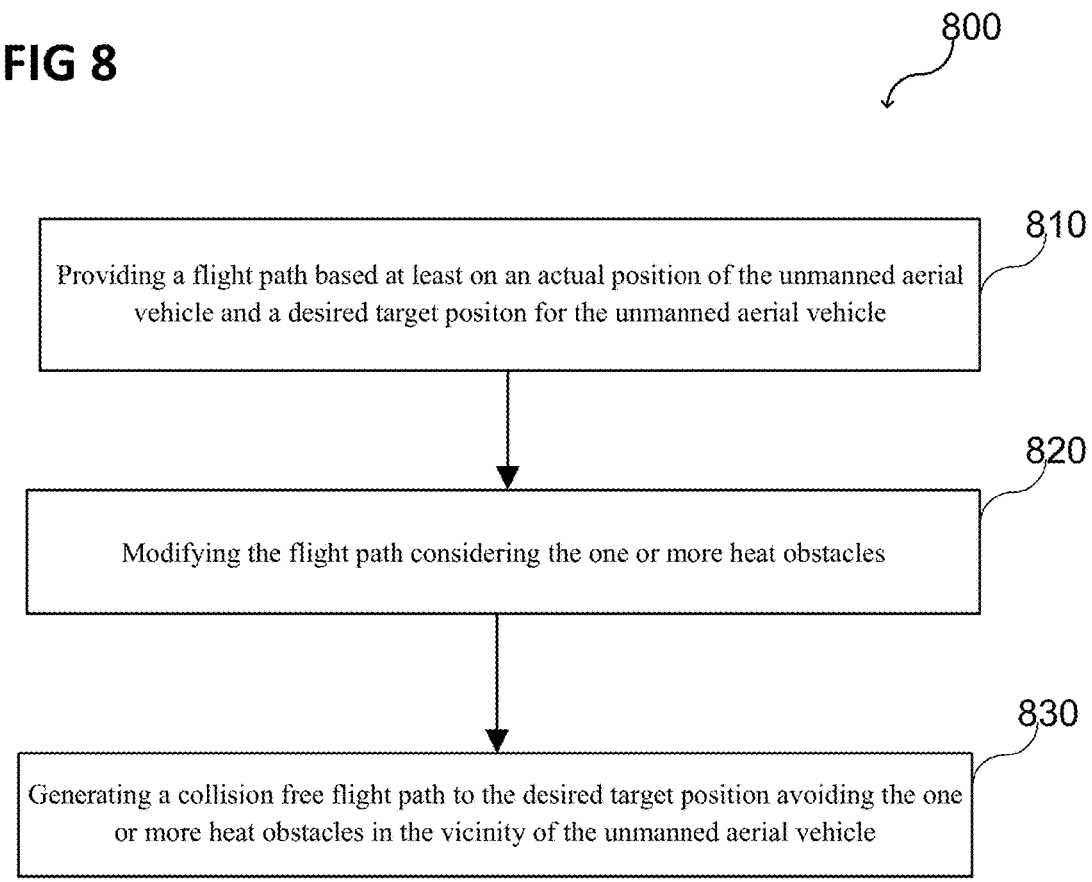
FIG. 8 shows an exemplary method for controlling an unmanned aerial vehicle, according to some aspects.

FIG. 8 illustrates a schematic flow diagram of a method 800 for controlling an unmanned aerial vehicle based on thermal information associated with a vicinity of the unmanned aerial vehicle (e.g., the unmanned aerial vehicle 102, 600 as described herein), according to some aspects. The method 800 may include: in 810, providing a flight path based at least on an actual position of the unmanned aerial vehicle and a desired target position for the unmanned aerial vehicle, in 820, modifying the flight path considering the one or more heat obstacles, and, in 830, generating a collision free flight path to the desired target position avoiding the one or more heat obstacles in the vicinity of the unmanned aerial vehicle.

According to various aspects, a vicinity of an unmanned aerial vehicle 102 may be a surrounding of the unmanned aerial vehicle 102 with a distance up to 50 m, 100 m, or greater, e.g., 1 km. The distance may be in some aspects defined by the range of the one or more sensors of the unmanned aerial vehicle 102 and/or by the operation area in which the unmanned aerial vehicle 102 may be navigated.

In the following, various examples are provided with reference to the aspects described above.

Example 1 is an unmanned aerial vehicle. The unmanned aerial vehicle may include one or more sensors configured to gather thermal information associated with a vicinity of the unmanned aerial vehicle, one or more processors configured to determine at least one control information based on the thermal information and to control the unmanned aerial vehicle based on the at least one control information.

In Example 2, the subject matter of Example 1 can optionally include that the one or more sensors are configured to generate a thermal image having the thermal information associated therewith.

In Example 3, the subject matter of any one of Examples 1 or 2 can optionally include that the one or more sensors include at least one infrared thermal imaging camera to generate the thermal information.

In Example 4, the subject matter of any one of Examples 2 or 3 can optionally include that the one or more sensors are further configured to generate a depth image having depth information associated therewith.

In Example 5, the subject matter of Example 4 can optionally include that the one or more sensors include at least one time of flight (ToF) camera to generate the depth information.

In Example 6, the subject matter of any one of Examples 1 to 5 can optionally include that the one or more sensors include at least one temperature sensor to provide thermal information.

In Example 7, the subject matter of Example 6 can optionally include that the at least one temperature sensor includes a thermocouple.

In Example 8, the subject matter of any one of Examples 1 to 7 can optionally include that the one or more sensors are configured to monitor the vicinity in predefined time intervals.

In Example 9, the subject matter of any one of Examples 1 to 8 can optionally include that the one or more processors are configured to generate a map representing the vicinity of the unmanned aerial vehicle. The at least one control information includes one or more map elements associated with the map.

In Example 10, the subject matter of any one of Examples 1 to 9 can optionally include that the map is a two-dimensional map representing a flight area of the unmanned aerial vehicle.

In Example 11, the subject matter of any one of Examples 1 to 9 can optionally include that the map is a three-dimensional map representing a flight area of the unmanned aerial vehicle.

In Example 12, the subject matter of any one of Examples 9 to 11 can optionally include that the one or more processors are configured to determine the one or more map elements by mapping a thermal image having the thermal information associated therewith and a depth image having depth information associated therewith to one another and assigning position information and the thermal information to one or more objects in the vicinity of the unmanned aerial vehicle.

In Example 13, the subject matter of any one of Examples 9 to 11 can optionally include that the one or more processors are configured to determine the one or more map elements based on the thermal information and position information representing a position of the unmanned aerial vehicle.

In Example 14, the subject matter of any one of Examples 9 to 13 can optionally include that controlling the unmanned aerial vehicle based on the at least one control information includes controlling flight of the unmanned aerial vehicle based on the map.

In Example 15, the subject matter of any one of Examples 9 to 14 can optionally include that the one or more processors are configured to determine one or more heat obstacles in the vicinity of the unmanned aerial vehicle based on the map.

In Example 16, the subject matter of Example 15 can optionally include that the one or more processors are configured to generate a collision free flight path to a desired target position avoiding the one or more heat obstacles in the vicinity.

In Example 17, the subject matter of Example 15 can optionally include that the one or more processors are configured to provide a flight path based at least on an actual position of the unmanned aerial vehicle and a desired target position for the unmanned aerial vehicle, to modify the flight path considering the one or more heat obstacles, and to generate a collision free flight path to the desired target position avoiding the one or more heat obstacles in the vicinity of the unmanned aerial vehicle.

In Example 18, the subject matter of Example 15 can optionally include that the one or more processors are configured to provide one or more collision avoidance operations based on the detected heat obstacles, the collision avoidance operations comprising at least one of the following operations: stopping at a pre-defined safety distance from the detected heat obstacle, circumflying the detected heat obstacle with a pre-defined safety distance, increasing distance from the detected heat obstacle, returning to a pre-defined safety position.

In Example 19, the subject matter of any one of Examples 1 to 15 can optionally include that the at least one control information includes one or more flight commands.

In Example 20, the subject matter of any one of Examples 1 to 19 can optionally include that the at least one control information includes one or more alarm messages.

Example 21 is an unmanned aerial vehicle. The unmanned aerial vehicle may include one or more sensors configured to detect one or more objects in a vicinity of the unmanned aerial vehicle, to generate position data associated with a position of the one or more detected objects, and to generate temperature data associated with a temperature of the one or more objects. The unmanned aerial vehicle may further include one or more processors configured to generate a map based on the position data and the temperature data, the map representing the vicinity of the unmanned aerial vehicle and the one or more objects, and to control flight of the unmanned aerial vehicle based on the map.

In Example 22, the subject matter of Example 21 can optionally include that the one or more objects include at least one of a solid object, a liquid object, or a gaseous object.

In Example 23, the subject matter of any one of Examples 21 or 22 can optionally include that the one or more sensors are configured to provide movement data associated with a movement of the one or more objects relative to ground.

In Example 24, the subject matter of any one of Examples 21 to 23 can optionally include that the one or more processors are configured to determine heat obstacles in the vicinity of the unmanned aerial vehicle based on the map.

In Example 25, the subject matter of Example 24 can optionally include that the one or more processors are configured to generate a collision free flight path to a desired target position avoiding the heat obstacles in the vicinity of the unmanned aerial vehicle.

In Example 26, the subject matter of Example 24 can optionally include that the one or more processors are configured to provide a flight path based at least on an actual position of the unmanned aerial vehicle and a desired target position for the unmanned aerial vehicle, to modify the flight path based on heat obstacles detected by the one or more sensors, and to generate a collision free flight path to the desired target position avoiding the heat obstacles in the vicinity of the unmanned aerial vehicle.

In Example 27, the subject matter of Example 24 can optionally include that the one or more processors are configured to provide one or more collision avoidance operations based on a detected heat obstacle, the collision avoidance operations including at least one of the following operations: stopping at a pre-defined safety distance from the detected heat obstacle, circumflying the detected heat obstacle with a pre-defined safety distance, increasing a distance from the detected heat obstacle, returning to a pre-defined safety position.

Example 28 is an unmanned aerial vehicle. The unmanned aerial vehicle may include one or more memories comprising position information associated with one or more objects and thermal information associated with the one or more objects, and one or more processors configured to control flight of the unmanned aerial vehicle based on the position information and the thermal information.

In Example 29, the subject matter of Example 28 can optionally include that the one or more objects comprise at least one of a solid object, a liquid object, or a gaseous object.

In Example 30, the subject matter of any one of Examples 28 or 29 can optionally include that the unmanned aerial vehicle further includes one or more sensors configured to generate the position information and the thermal information.

In Example 31, the subject matter of any one of Examples 28 or 29 can optionally include that the unmanned aerial vehicle further includes one or more receivers configured to receive the position information and the thermal information and to provide the position information and the thermal information to the one or more memories.

In Example 32, the subject matter of any one of Examples 28 to 31 can optionally include that the one or more processors are configured to determine heat obstacles in the vicinity based on the map.

In Example 33, the subject matter of Example 32 can optionally include that the one or more processors are configured to generate a collision free flight path to a desired target position avoiding the heat obstacles in the vicinity of the unmanned aerial vehicle.

In Example 34, the subject matter of Example 32 can optionally include that the one or more processors are configured to provide a flight path based at least on an actual position of the unmanned aerial vehicle and a desired target position for the unmanned aerial vehicle, to modify the flight path based on heat obstacles detected by the one or more sensors, and to generate a collision free flight path to the desired target position avoiding the heat obstacles in the vicinity of the unmanned aerial vehicle.

In Example 35, the subject matter of Example 32 can optionally include that the one or more processors are configured to provide one or more collision avoidance operations based on a detected heat obstacle, the collision avoidance operations comprising at least one of the following operations: stopping at a pre-defined safety distance from the detected heat obstacle, circumflying the detected heat obstacle with a pre-defined safety distance, increasing distance from the detected heat obstacle, returning to a pre-defined safety position.

Example 36 is an unmanned aerial vehicle. The unmanned aerial vehicle may include one or more memories comprising position information associated with a position in a flight area of the unmanned aerial vehicle and thermal information associated with a temperature at the position, and one or more processors configured to control flight of the unmanned aerial vehicle based on the position information and the thermal information.

In Example 37, the subject matter of Example 36 can optionally include that the unmanned aerial vehicle further includes one or more sensors configured to generate the position information and the thermal information.

In Example 38, the subject matter of any one of Examples 36 or 37 can optionally include that the unmanned aerial vehicle further includes one or more receivers configured to receive the position information and the thermal information.

Example 39 is an unmanned aerial vehicle. The unmanned aerial vehicle may include one or more sensors configured to detect heat obstacles in a vicinity of the unmanned aerial vehicle, and one or more processors configured to provide a flight path based at least on an actual position of the unmanned aerial vehicle and a desired target position for the unmanned aerial vehicle, to modify the flight path based on heat obstacles detected by the one or more sensors, and to generate a collision free flight path to the desired target position avoiding the heat obstacles in the vicinity of the unmanned aerial vehicle.

In Example 40, the subject matter of Example 39 can optionally include that the one or more heat obstacles include at least one of a solid heat obstacle, a liquid heat obstacle, or a gaseous heat obstacle.

Example 41 is a method for operating an unmanned aerial vehicle. The method may include receiving thermal information associated with a vicinity of the unmanned aerial vehicle, determining at least one control information based on the thermal information, and controlling the unmanned aerial vehicle based on the at least one control information.

In Example 42, the subject matter of Example 41 can optionally include that receiving thermal information includes generating a thermal image having the thermal information associated therewith.

In Example 43, the subject matter of Example 42 can optionally include that the method further includes mapping a depth image having depth information associated therewith to the thermal image.

In Example 44, the subject matter of any one of Examples 41 to 43 can optionally include that receiving thermal information further includes measuring a temperature of at least one object in the vicinity of the unmanned aerial vehicle.

In Example 45, the subject matter of any one of Examples 41 to 44 can optionally include that receiving thermal information includes monitoring the vicinity of the unmanned aerial vehicle in predefined time intervals.

In Example 46, the subject matter of any one of Examples 41 to 45 can optionally include that the method further includes generating a map representing the vicinity of the unmanned aerial vehicle; the at least one control information including one or more map elements associated with the map.

In Example 47, the subject matter of Example 46 can optionally include that the map is a two-dimensional map representing a flight area of the unmanned aerial vehicle.

In Example 48, the subject matter of Example 46 can optionally include that the map is a three-dimensional map.

In Example 49, the subject matter of any one of Examples 46 to 48 can optionally include that the one or more map elements are determined based on mapping a thermal image having the thermal information associated therewith and a depth image having depth information associated therewith to one another and assigning position information and the thermal information to one or more objects in the vicinity of the unmanned aerial vehicle.

In Example 50, the subject matter of any one of Examples 46 to 49 can optionally include that the one or more map elements are determined based on position information representing a position of the unmanned aerial vehicle and the thermal information.

In Example 51, the subject matter of any one of Examples 46 to 50 can optionally include that controlling the unmanned aerial vehicle based on the at least one control information includes control flight of the unmanned aerial vehicle based on the map.

In Example 52, the subject matter of any one of Examples 46 to 51 can optionally include that the method further includes determining one or more heat obstacles in the vicinity of the unmanned aerial vehicle based on the map.

In Example 53, the subject matter of Example 52 can optionally include that controlling the unmanned aerial vehicle includes generating a collision free flight path to a desired target position avoiding the one or more heat obstacles in the vicinity.

In Example 54, the subject matter of Example 52 can optionally include that controlling the unmanned aerial vehicle includes: providing a flight path based at least on an actual position of the unmanned aerial vehicle and a desired target position for the unmanned aerial vehicle, modifying the flight path considering the one or more heat obstacles, and generating a collision free flight path to the desired target position avoiding the one or more heat obstacles in the vicinity of the unmanned aerial vehicle In Example 55, the subject matter of Example 52 can optionally include that controlling the unmanned aerial vehicle includes: generating one or more collision avoidance operations based on the detected heat obstacles. The collision avoidance operations include at least one of the following operations: stopping at a pre-defined safety distance from the detected heat obstacle, circumflying the detected heat obstacle with a pre-defined safety distance, increasing distance from the detected heat obstacle, returning to a pre-defined safety position.

In Example 56, the subject matter of any one of Examples 41 to 55 can optionally include that the at least one control information includes one or more flight commands.

In Example 57, the subject matter of any one of Examples 41 to 56 can optionally include that the at least one control information includes one or more alarm messages.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. An unmanned aerial vehicle, comprising:
   one or more sensors configured to gather thermal information associated with a vicinity of the unmanned aerial vehicle; the one or more sensors comprising at least one infrared camera configured to generate thermal images having thermal data associated therewith and at least one depth camera configured to generate depth images having depth information associated therewith;
   one or more processors configured to:
   determine one or more map elements representing one or more heat obstacles, wherein the determination of the one or more map elements comprises:
   mapping the thermal images and the depth images to one another and assigning position data and the thermal data to one or more gaseous objects in the vicinity of the unmanned aerial vehicle;
   predicting a movement of the one or more gaseous objects to determine predicted positions of the one or more gaseous objects;
   generate a voxel map representing the vicinity of the unmanned aerial vehicle, the voxel map comprising the one or more map elements;
   control flight of the unmanned aerial vehicle based on ray tracing the one or more heat obstacles in the voxel map to avoid the one or more heat obstacles; and
   one or more memories configured to store the voxel map.

2. The unmanned aerial vehicle of claim 1,
   wherein the one or more sensors comprise at least one time of flight (ToF) camera to generate the depth information.

3. The unmanned aerial vehicle of claim 1,
   wherein the one or more sensors comprise at least one temperature sensor to provide thermal information.

4. The unmanned aerial vehicle of claim 3,
   wherein the at least one temperature sensor comprises a thermocouple.

5. The unmanned aerial vehicle of claim 1,
   wherein the one or more sensors are configured to monitor the vicinity in predefined time intervals.

6. The unmanned aerial vehicle of claim 1, wherein the one or more processors are configured to generate a flight command comprising one or more map elements associated with the voxel map.

7. The unmanned aerial vehicle of claim 6, wherein the one or more processors are configured to determine the one or more map elements based on the thermal information and position information representing a position of the unmanned aerial vehicle.

8. The unmanned aerial vehicle of claim 1, wherein the one or more sensors comprise at least one stereo camera to generate the depth information.

9. A method of controlling flight of an unmanned aerial vehicle, comprising:
gathering thermal information associated with a vicinity of the unmanned aerial vehicle;
generating thermal images having thermal data associated therewith and at generating depth images having depth information associated therewith;
determining one or more map elements representing one or more heat obstacles, wherein the determination of the one or more map elements comprises:
mapping the thermal images and the depth images to one another and assigning position data and the thermal data to one or more gaseous objects in the vicinity of the unmanned aerial vehicle;
predicting a movement of the one or more gaseous objects to determine predicted positions of the one or more gaseous objects;
generating a voxel map representing the vicinity of the unmanned aerial vehicle, the map comprising the one or more map elements;
controlling flight of the unmanned aerial vehicle based on ray tracing the one or more heat obstacles in the voxel map to avoid the one or more heat obstacles; and
storing the voxel map.

10. A non-transitory computer readable medium comprising computer readable instruction stored thereon to control flight of an unmanned aerial vehicle, comprising:
gathering thermal information associated with a vicinity of the unmanned aerial vehicle;
generating thermal images having thermal data associated therewith and at generating depth images having depth information associated therewith;
determining one or more map elements representing one or more heat obstacles, wherein the determination of the one or more map elements comprises:
mapping the thermal images and the depth images to one another and assigning position data and the thermal data to one or more gaseous objects in the vicinity of the unmanned aerial vehicle;
predicting a movement of the one or more gaseous objects to determine predicted positions of the one or more gaseous objects;
generating a voxel map representing the vicinity of the unmanned aerial vehicle, the map comprising the one or more map elements;
controlling flight of the unmanned aerial vehicle based on ray tracing the one or more heat obstacles in the voxel map to avoid the one or more heat obstacles; and
storing the voxel map.

11. An unmanned aerial vehicle flight control system comprising:
one or more sensors configured to gather thermal information associated with a vicinity of the unmanned aerial vehicle; the one or more sensors comprising at least one infrared camera configured to generate thermal images having thermal data associated therewith and at least one depth camera configured to generate depth images having depth information associated therewith;
one or more processors configured to:
determine one or more map elements representing one or more heat obstacles, wherein the determination of the one or more map elements comprises:
mapping the thermal images and the depth images to one another and assigning position data and the thermal data to one or more gaseous objects in the vicinity of the unmanned aerial vehicle;
predicting a movement of the one or more gaseous objects to determine predicted positions of the one or more gaseous objects;
generate a voxel map representing the vicinity of the unmanned aerial vehicle, the map comprising the one or more map elements;
control flight of the unmanned aerial vehicle based on ray tracing the one or more heat obstacles in the voxel map to avoid the one or more heat obstacles; and
one or more memories configured to store the voxel map.

12. The unmanned aerial vehicle flight control system of claim 11, wherein the one or more sensors comprise at least one time of flight (ToF) camera to generate the depth information.

13. The unmanned aerial vehicle flight control system of claim 12, wherein the one or more sensors comprise at least one stereo camera to generate the depth information.

* * * * *

UNITED STATES PATENT AND TRADEMARK OFFICE
CERTIFICATE OF CORRECTION

| | |
|---|---|
| PATENT NO. | : 10,459,445 B2 |
| APPLICATION NO. | : 15/718021 |
| DATED | : October 29, 2019 |
| INVENTOR(S) | : Stefan Menzel et al. |

Page 1 of 1

It is certified that error appears in the above-identified patent and that said Letters Patent is hereby corrected as shown below:

In the Claims

Column 22, Line 45-46, Claim 13, change 'control system of claim 12' to -- control system of claim 11 --.

Signed and Sealed this
Third Day of March, 2020

Andrei Iancu
*Director of the United States Patent and Trademark Office*